(12) United States Patent
Kong

(10) Patent No.: US 12,117,952 B2
(45) Date of Patent: Oct. 15, 2024

(54) MULTI-PATH SERVER AND MULTI-PATH SERVER SIGNAL INTERCONNECTION SYSTEM

(71) Applicant: Shandong Yingxin Computer Technologies Co., Ltd., Jinan (CN)

(72) Inventor: Xiangtao Kong, Jinan (CN)

(73) Assignee: Shandong Yingxin Computer Technologies Co., Ltd., Jinan (CN)

( * ) Notice: Subject to any disclaimer, the term of this patent is extended or adjusted under 35 U.S.C. 154(b) by 0 days.

(21) Appl. No.: 18/276,413

(22) PCT Filed: Sep. 28, 2021

(86) PCT No.: PCT/CN2021/121428
§ 371 (c)(1),
(2) Date: Aug. 8, 2023

(87) PCT Pub. No.: WO2022/179105
PCT Pub. Date: Sep. 1, 2022

(65) Prior Publication Data
US 2024/0045821 A1 Feb. 8, 2024

(30) Foreign Application Priority Data
Feb. 24, 2021 (CN) .......................... 202110205309.4

(51) Int. Cl.
*G06F 13/40* (2006.01)
(52) U.S. Cl.
CPC ................. *G06F 13/4022* (2013.01)
(58) Field of Classification Search
None
See application file for complete search history.

(56) References Cited

U.S. PATENT DOCUMENTS

| | | | |
|---|---|---|---|
| 9,015,368 B2* | 4/2015 | Christison | H04W 28/06 710/33 |
| 9,411,770 B2* | 8/2016 | Decesaris | G06F 13/4291 |

(Continued)

FOREIGN PATENT DOCUMENTS

| | | |
|---|---|---|
| CN | 105760340 A | 7/2016 |
| CN | 106776457 A | 5/2017 |

(Continued)

OTHER PUBLICATIONS

International Search Report dated Jan. 6, 2022; International application PCT/CN2021/121428.

(Continued)

*Primary Examiner* — Henry Tsai
*Assistant Examiner* — Christopher A Bartels
(74) *Attorney, Agent, or Firm* — DINSMORE & SHOHL LLP (57) ABSTRACT

The multi-path server comprises four circuits. Each circuit comprises a PCH, an extended module, a switch module, and a CPU. An extended module in the first circuit is connected to a switch module in the second circuit, a switch module in the third circuit, and a switch module in the fourth circuit. An extended module in the third circuit is connected to a switch module in the fourth circuit. A switch module performs switching action according to a target partition instruction, and a PCH performs in-place action according to the target partition instruction, such that each said circuit forms a target partition, and PMSYNC signals are interconnected in the target partition. A multi-path server signal interconnection system is also provided.

19 Claims, 5 Drawing Sheets

(56) References Cited

U.S. PATENT DOCUMENTS

| | | | |
|---|---|---|---|
| 10,387,346 B2* | 8/2019 | Ni | G06F 12/0246 |
| 10,571,972 B2* | 2/2020 | Shao | G06F 1/3218 |
| 10,956,324 B1* | 3/2021 | Giles | G06F 9/526 |
| 11,386,029 B2* | 7/2022 | Winblad | G06F 13/28 |
| 2005/0251775 A1* | 11/2005 | Wood | H03B 5/1852 |
| | | | 716/132 |
| 2014/0089688 A1* | 3/2014 | Man | G06F 1/3206 |
| | | | 713/300 |
| 2014/0201513 A1 | 7/2014 | Liu | |
| 2018/0332374 A1* | 11/2018 | Viljoen | H04L 45/60 |
| 2019/0149365 A1* | 5/2019 | Chatterjee | H04L 25/0226 |
| | | | 370/329 |
| 2019/0243637 A1* | 8/2019 | Nachimuthu | G06F 8/656 |
| 2021/0209052 A1 | 7/2021 | Chen | |

FOREIGN PATENT DOCUMENTS

| | | |
|---|---|---|
| CN | 107220194 A | 9/2017 |
| CN | 108182163 A | 6/2018 |
| CN | 110968352 A | 4/2020 |
| CN | 112000501 A | 11/2020 |
| CN | 112069106 A | 12/2020 |
| CN | 112987900 A | 6/2021 |

OTHER PUBLICATIONS

Written Opinion of the searching authority dated Jan. 6, 2022; International Application PCT/CN2021/121428.
1st Office Action of corresponding Chinese application No. 2021102053094, dated Feb. 24, 2021.
Notification of Grant of Invention Patent Right dated Dec. 19, 2022; Application No. 202110205309.4.

* cited by examiner

MULTI-PATH SERVER AND MULTI-PATH SERVER SIGNAL INTERCONNECTION SYSTEM

CROSS-REFERENCE TO RELATED APPLICATIONS

This application is the U.S. National Stage of PCT/CN2021/121428 filed on Sep. 28, 2021, which claims priority to Chinese Patent Application 202110205309.4 filed on Feb. 24, 2021, the entire content of both are incorporated herein by reference in their entirety.

TECHNICAL FIELD

The present application relates to the field of server technologies, and more specifically, to a multi-path server and a multi-path server signal interconnection system.

BACKGROUND

In the field of high-end servers, a quantity of processors can be up to 8, that is, such servers are 8-path servers. In an 8-path server, eight processors can be configured into a single partition, a secondary partition, and a quarter partition. In addition, in the servers, power management synchronization (PMSYNC) signals are used for information exchange of a power management status between a platform controller hub (PCH) and all central processing units (CPUs).

In the prior art, during interconnection of PMSYNC signals in an 8-path server, the eight processors can only be configured into a fixed partition of a single partition, a secondary partition, or a quarter partition. In this case, PMSYNC signals can only be interconnected in the configured fixed partition. As a result, the interconnection flexibility of PMSYNC signals is low, and the applicability of 8-path servers is reduced.

In summary, how to improve the interconnection flexibility of PMSYNC signals is currently a pressing technical problem to be resolved by persons skilled in the art.

SUMMARY

In view of this, an objective of the of the present application is to provide a multi-path server and a multi-path server signal interconnection system, to improve the interconnection flexibility of PMSYNC signals.

To achieve the foregoing objective, the following technical solutions are provided in the present application.

A multi-path server includes a first circuit, a second circuit, a third circuit, and a fourth circuit, each of the four circuits including a PCH configured to output PMSYNC signals when in place, an extended module connected to the PCH and configured to extend the PMSYNC signal into multiple paths, a switch module connected to the extended module, and two CPUs connected to the switch module, where an extended module in the first circuit is connected to a switch module in the second circuit, a switch module in the third circuit, and a switch module in the fourth circuit, an extended module in the third circuit is connected to a switch module in the fourth circuit; and after a switch module and a PCH in each said circuit receive a target partition instruction, the switch module performs switching action according to the target partition instruction, and the PCH performs in-place action according to the target partition instruction, such that each said circuit forms a target partition corresponding to the target partition instruction, and the PMSYNC signals are interconnected in the target partition through a corresponding CPU; the target partition includes a single partition, a secondary partition, and a quarter partition.

In an embodiment of the present application, the multi-path server further includes a first computing board, a second computing board, a third computing board, a fourth computing board, and a backplate connected to the four computing boards, where the first circuit is located on the first computing board, the second circuit is located on the second computing board, the third circuit is located on the third computing board, the fourth circuit is located on the fourth computing board, an extended module in the first circuit is connected to a switch module in the second circuit, a switch module in the third circuit, and a switch module in the fourth circuit through the backplate, and an extended module in the third circuit is connected to a switch module in the fourth circuit through the backplate.

In an embodiment of the present application, the extended module includes a first extender and a second extender:

each said first extender is connected to a switch module in a computing board in which the first extender is located, a first extender in the first computing board is connected to a switch module in the second computing board, a second extender in the first computing board is connected to a switch module in the third computing board and a switch module in the fourth computing board, and a first extender in the third computing board is connected to a switch module in the fourth computing board.

In an embodiment of the present application, the switch module includes a first switch group, a second switch group, and a third switch group:

a first terminal of each said first switch group is configured to receive the target partition instruction, a second terminal of each said first switch group is connected to a first extender in a computing board in which the first switch group is located, and a third terminal of each said first switch group is connected to the CPUs in the computing board in which the first switch group is located;

a first terminal of each said second switch group is configured to receive the target partition instruction, a second terminal of each said second switch group is connected to the CPUs in a computing board in which the second switch group is located, and a third terminal of each said second switch group is connected to a first terminal of a third switch group of the computing board in which the second switch group is located; and a second terminal of each said third switch group is configured to receive the target partition instruction, a third terminal and a fourth terminal of a third switch group in the second computing board are both connected to a first extender in the first computing board, a third terminal of a third switch group in the third computing board is connected to a second extender in the first computing board, a third terminal of a third switch group in the fourth computing board is connected to a second extender in the first computing board, and a fourth terminal of a third switch group in the fourth computing board is connected to a first extender in the third computing board.

In an embodiment of the present application, the first switch group includes a first analog switch and a second analog switch, a first terminal of the first analog switch and a first terminal of the second analog switch are used as a first terminal of the first switch group, a second terminal of the first analog switch and a second terminal of the second analog switch are used as a second terminal of the first switch group, the second terminal of the first analog switch is connected to a first output terminal of the first extender, the second terminal of the second analog switch is connected to a second output terminal of the first extender, a third terminal of the first analog switch and a third terminal of the second analog switch are used as a third terminal of the first switch group, the third terminal of the first analog switch is connected to a first CPU in a computing board in which the first analog switch is located, and the third terminal of the second analog switch is connected to a second CPU in a computing board in which the second analog switch is located.

In an embodiment of the present application, the second switch group includes a third analog switch and a fourth analog switch, a first terminal of the third analog switch and a first terminal of the fourth analog switch are used as a first terminal of the second switch group, a second terminal of the third analog switch and a second terminal of the fourth analog switch are used as a second terminal of the second switch group, a second terminal of the third analog switch is connected to a second CPU in a computing board in which the third analog switch is located, a second terminal of the fourth analog switch is connected to a first CPU in a computing board in which the fourth analog switch is located, and a third terminal of the third analog switch and a third terminal of the fourth analog switch are used as a third terminal of the second switch group.

In an embodiment of the present application, the third switch group includes a first multiplexer and a second multiplexer, a first terminal of the first multiplexer and a first terminal of the second multiplexer are used as a first terminal of the third switch group, the first terminal of the first multiplexer is connected to a third terminal of a fourth analog switch in a computing board in which the first multiplexer is located, a first terminal of the second multiplexer is connected to a third terminal of a third analog switch in a computing board in which the second multiplexer is located, a second terminal of the first multiplexer and a second terminal of the second multiplexer are used as a second terminal of the third switch group, a third terminal of the first multiplexer and a third terminal of the second multiplexer are used as a third terminal of the third switch group, and a fourth terminal of the first multiplexer and a fourth terminal of the second multiplexer are used as a fourth terminal of the third switch group;

a third terminal and a fourth terminal of the first multiplexer in the second computing board are connected to a third output terminal of a first extender in the first computing board, and a third terminal and a fourth terminal of the second multiplexer in the second computing board are connected to a fourth output terminal of a first extender in the first computing board;

a third terminal of a first multiplexer in the third computing board is connected to a first output terminal of a second extender in the first computing board, and a third terminal of a second multiplexer in the third computing board is connected to a second output terminal of a second extender in the first computing board; and a third terminal of a first multiplexer in the fourth computing board is connected to a third output terminal of a second extender in the first computing board, a fourth terminal of a first multiplexer in the fourth computing board is connected to a third output terminal of a first extender in the third computing board, a third terminal of a second multiplexer in the fourth computing board is connected to a fourth output terminal of a second extender in the first computing board, and a fourth terminal of a second multiplexer in the fourth computing board is connected to a fourth output terminal of a second extender in the third computing board.

In an embodiment of the present application, the backplate is connected to each computing board by a high-speed connector.

A multi-path server signal interconnection system includes the foregoing multi-path server, and a controller connected to a PCH and a switch module in each computing board in the multi-path server, where the controller is configured to output a target partition instruction.

The present application provides a multi-path server and a multi-path server signal interconnection system. The multi-path server includes a first circuit, a second circuit, a third circuit, and a fourth circuit. Each of the four circuits includes a PCH configured to output PMSYNC signals when in place, an extended module connected to the PCH and configured to extend the PMSYNC signal into multiple paths, a switch module connected to the extended module, and two CPUs connected to the switch module. An extended module in the first circuit is connected to a switch module in the second circuit, a switch module in the third circuit, and a switch module in the fourth circuit. An extended module in the third circuit is connected to a switch module in the fourth circuit. After a switch module and a PCH in each said circuit receive a target partition instruction, the switch module performs switching action according to the target partition instruction, and the PCH performs in-place action according to the target partition instruction, such that each said circuit forms a target partition corresponding to the target partition instruction, and the PMSYNC signals are interconnected in the target partition through a corresponding CPU. The target partition includes a single partition, a secondary partition, and a quarter partition.

In the foregoing technical solution according to the embodiments of the present application, each of the first circuit, the second circuit, the third circuit, and the fourth circuit includes a PCH, an extended module connected to the PCH, a switch module connected to the extended module, and two CPUs connected to the switch module. The extended module in the first circuit is connected to the switch module in the second circuit, the switch module in the third circuit, and the switch module in the fourth circuit. The extended module in the third circuit is connected to the switch module in the fourth circuit. After the switch module and the PCH in each said circuit receive a target partition instruction, the switch module performs switching action according to the target partition instruction, and the PCH performs in-place action according to the target partition instruction, such that each said circuit forms a target partition such as a single partition, a secondary partition, and a quarter partition corresponding to the target partition instruction, that is, PMSYNC signals can be interconnected in the single partition, the secondary partition, and the quarter partition by using eight CPUs, to change the current situation that PMSYNC signals can only be interconnected in a single fixed partition formed by eight CPUs. Therefore, the interconnection flexibility of PMSYNC signals can be improved, so that the applicability of an 8-path server is improved.

BRIEF DESCRIPTION OF THE DRAWINGS

To describe the technical solutions in the embodiments of the present application or the prior art more clearly, the following briefly introduces the accompanying drawings required for describing the embodiments or the prior art. Apparently, the accompanying drawings in the following description show merely embodiments of the present application, and a person of ordinary skill in the art may still derive other drawings from the provided accompanying drawings without creative efforts.

DETAILED DESCRIPTION

Figure 1:
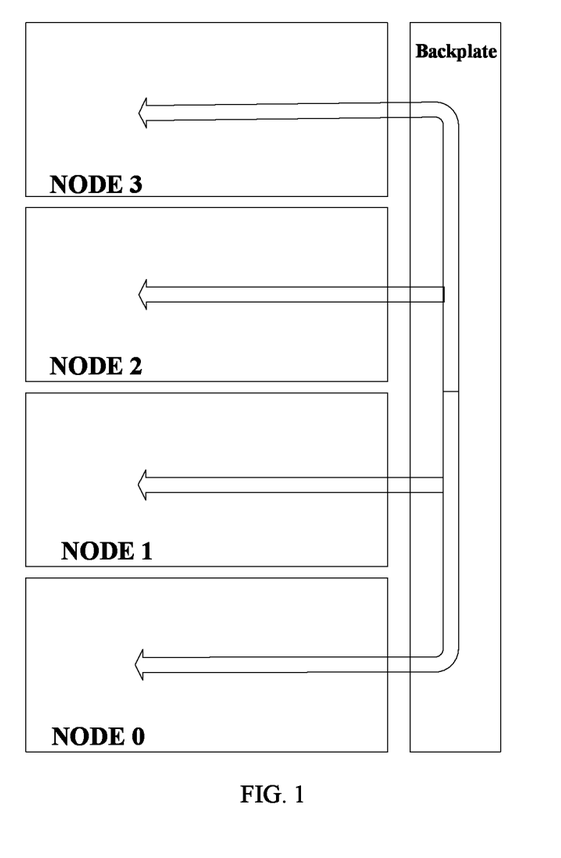
FIG. 1 is a schematic diagram of a single partition.
Figure 2:
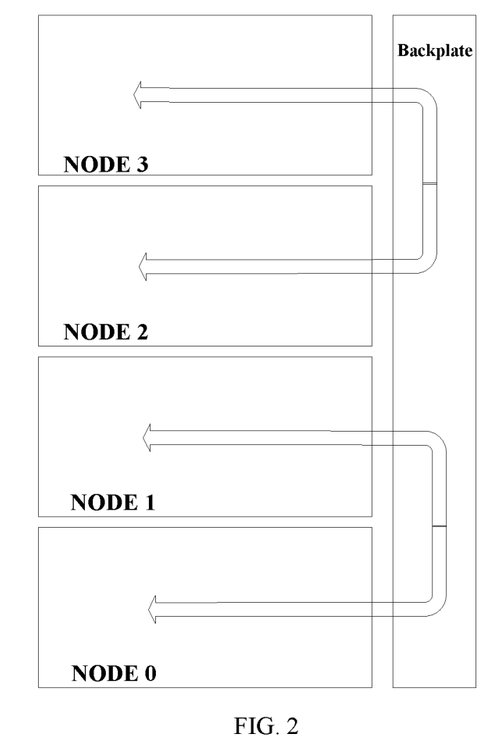
FIG. 2 is a schematic diagram of a secondary partition.
Figure 3:
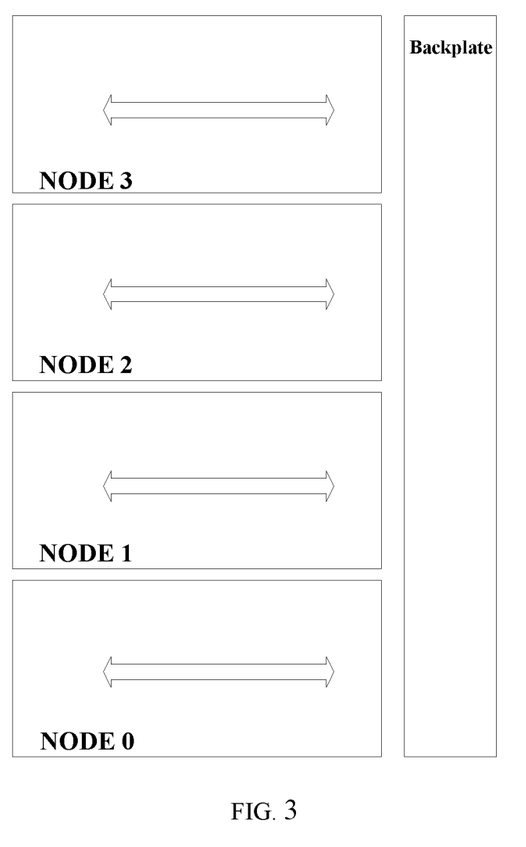
FIG. 3 is a schematic diagram of a quarter partition.

In a high-end server, an 8-path server needs to be configured into a single partition mode, a secondary partition mode, and a quarter partition mode. For details, refer to FIG. 1 to FIG. 3. FIG. 1 is a schematic diagram of a single partition. FIG. 2 is a schematic diagram of a secondary partition. FIG. 3 is a schematic diagram of a quarter partition. In FIG. 1 to FIG. 3, each node includes two CPUs. A single partition refers to that four nodes (that is, eight CPUs) are physically interconnected to form a complete 8-path system. A secondary partition refers to that the entire server includes two independent 4-path system. Each 4-path system is formed by physically interconnecting two nodes (that is, four CPUs). A quarter partition is that the entire server includes four independent 2-path systems. Each 2-path system is formed by physically interconnecting one node (that is, two CPUs). Power management synchronization (PMSYNC) signals are signals for power management synchronization on an Intel platform, and are used for information exchange of a power management status between a PCH hub and all CPUs. In the prior art, to implement interconnection of PMSYNC signals, the eight processors can only be configured into a fixed partition of a single partition, a secondary partition, or a quarter partition. In this case, PMSYNC signals can only be interconnected in the configured fixed partition, and no change can be performed. As a result, the interconnection flexibility of PMSYNC signals is low, and the applicability of 8-path servers is reduced.

For this, the present application provides a technical solution that improves the interconnection flexibility of PMSYNC signals, to improve the applicability of an 8-path server.

To enable a person skilled in the art to better understand the technical solution of the present application, the following clearly and completely describes the technical solutions in the embodiments of the present application with reference to the accompanying drawings in the embodiments of the present application. Apparently, the described embodiments are only some embodiments of the present application rather than all the embodiments. All other embodiments obtained by a person of ordinary skill in the art based on embodiments of the present application without creative efforts shall fall within the protection scope of the present application.

Figure 4:
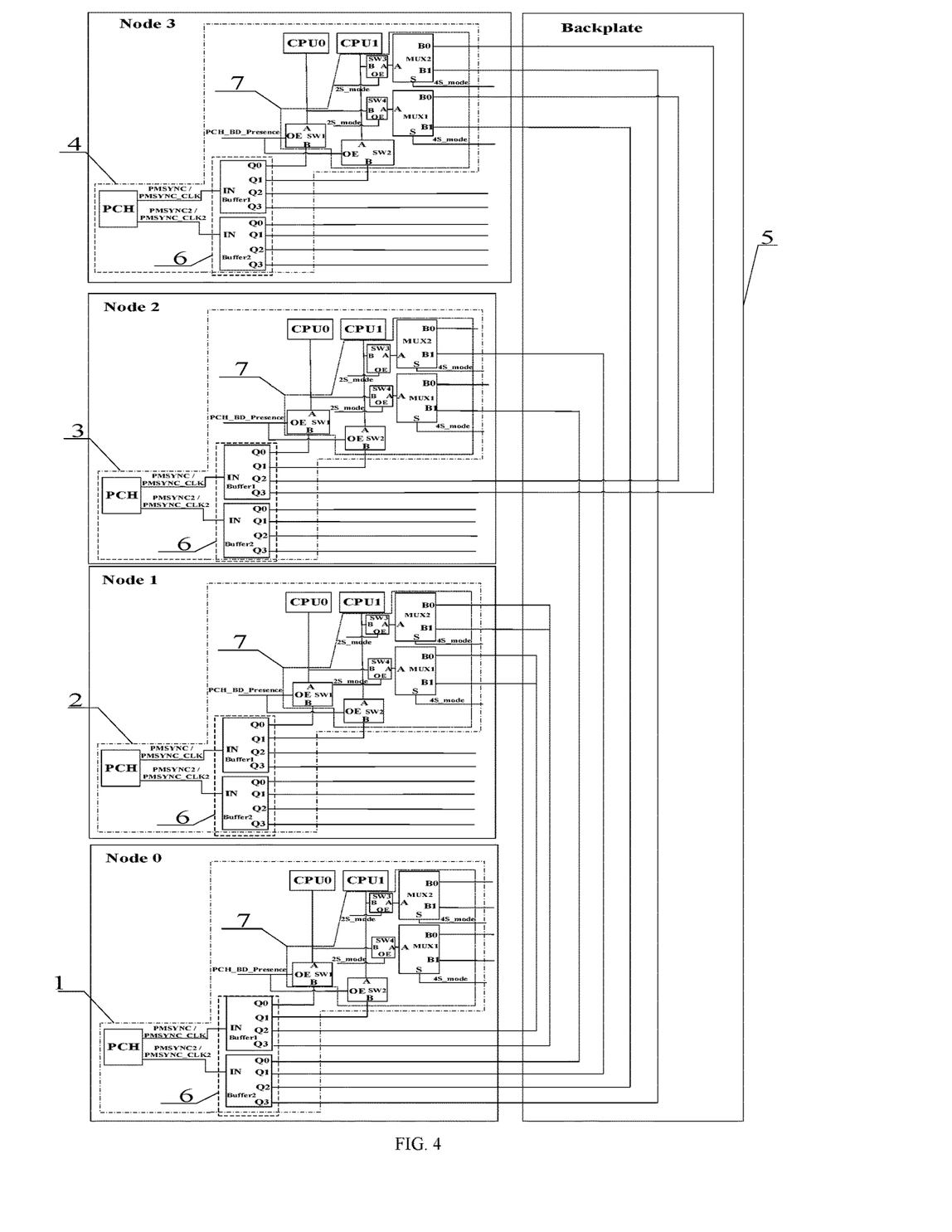
FIG. 4 is a schematic structural diagram of a multi-path server according to an embodiment of the present application.
Figure 5:
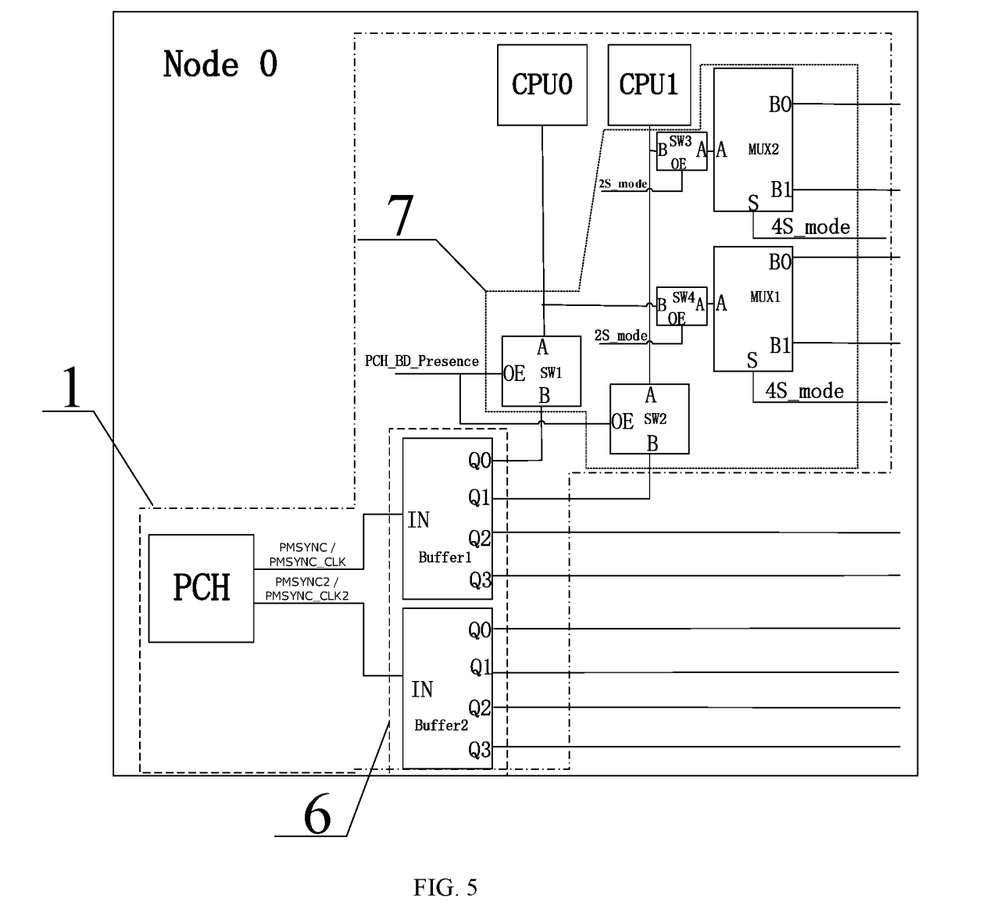
FIG. 5 is a schematic structural diagram of a first computing board in a multi-path server according to an embodiment of the present application.

Refer to FIG. 4 and FIG. 5. FIG. 4 is a schematic structural diagram of a multi-path server according to an embodiment of the present application. FIG. 5 is a schematic structural diagram of a first circuit in a multi-path server according to an embodiment of the present application. A multi-path server provided in embodiments of the present application may include a first circuit 1, a second circuit 2, a third circuit 3, and a fourth circuit 4. Each of the four circuits may include a PCH configured to output PMSYNC signals when in place, an extended module 6 connected to the PCH and configured to extend the PMSYNC signal into multiple paths, a switch module 7 connected to the extended module 6, and two CPUs connected to the switch module 7.

An extended module 6 in the first circuit 1 is connected to a switch module 7 in the second circuit 2, a switch module 7 in the third circuit 3, and a switch module 7 in the fourth circuit 4, an extended module 6 in the third circuit 3 is connected to a switch module 7 in the fourth circuit 4.

After a switch module 7 and a PCH in each said circuit receive a target partition instruction, the switch module 7 performs switching action according to the target partition instruction, and the PCH performs in-place action according to the target partition instruction, such that each said circuit forms a target partition corresponding to the target partition instruction, and the PMSYNC signals are interconnected in the target partition through a corresponding CPU. The target partition may include a single partition, a secondary partition, and a quarter partition.

The multi-path server provided in the present application may include the first circuit 1, the second circuit 2, the third circuit 3, and the fourth circuit 4. The first circuit 1, the second circuit 2, the third circuit 3, and the fourth circuit 4 may be specifically designed based on an Intel platform. Hardware structures of the four circuits may be identical (structures of the second circuit 2, the third circuit 3, and the fourth circuit 4 are the same as a structure of the first circuit 1 in FIG. 5). Each circuit includes two CPUs (that is, two Intel processors, namely, a first CPU (that is, CPU0 in FIG. 4) and a second CPU (that is, CPU1 in FIG. 4)). Each circuit further includes a PCH, an extended module 6 connected to the PCH, and a switch module 7 connected to the extended module 6 and the two CPUs. The PCH is configured to output PMSYNC signals when in place. A PMSYNC signal is formed by a pair of signals: PMSYNC and PMSYNC_CLK. The PMSYNC is used for data transmission, and PMSYNC_CLK is a clock signal used for synchronizing data. In addition, there are further PMSYNC2 and PMSYNC_CLK2 on the PCH. That is, the PCH may output two pairs of PMSYNC signals when in place. Therefore, a multi-path server can be supported. The extended module 6 is configured to extend the PMSYNC signal outputted by the PCH into multi-path outputs, and at the same time the switch module 7 carried on the circuit may implement signal routing in a different partition.

In the multi-path server provided in the present application, an extended module 6 in the first circuit 1 is connected to a switch module 7 in the second circuit 2, a switch module 7 in the third circuit 3, and a switch module 7 in the fourth circuit 4, an extended module 6 in the and third circuit 3 is connected to a switch module 7 in the fourth circuit 4.

After a switch module 7 and a PCH in each of the four circuits receive a target partition instruction, the switch module 7 performs switching action according to the received target partition instruction, and the PCH performs in-place action according to the received target partition instruction, such that each said circuit forms a target partition corresponding to the target partition instruction, and the PMSYNC signals sent by the PCH are interconnected in the formed target partition through a corresponding CPU. The target partition instruction discussed above includes a single partition instruction, a secondary partition instruction, and a quarter partition instruction. Correspondingly, the formed target partition includes a single partition corresponding to the single partition instruction, a secondary partition instruction corresponding to the secondary partition, and a quarter partition instruction corresponding to the quarter partition.

Specifically, when the target partition instruction is a single partition instruction, in this case, only a PCH in the first circuit 1 is in place, and none of PCHs in the other three circuits is in place. Through switching action of the switch module 7 in each circuit, the first circuit 1, the second circuit 2, the third circuit 3, and the fourth circuit 4 form an 8-path server (that is, form a single partition). A PMSYNC signal given by the PCH in the first circuit 1 is outputted to two CPUs in the first circuit 1 through the extended module 6 in the first circuit, and the PMSYNC signal given by the PCH in the first circuit 1 is outputted to two CPUs in the second circuit 2 through the extended module 6 in the first circuit 1 and the switch module 7 in the second circuit 2, is outputted to two CPUs in the third circuit 3 through the extended module 6 in the first circuit 1 and the switch module 7 in the third circuit 3, and is outputted to two CPUs in the fourth circuit 4 through the extended module 6 in the first circuit 1 and the switch module 7 in the fourth circuit 4, to implement interconnection of PMSYNC signals in the single partition.

When the target partition instruction is a secondary partition instruction, in this case, the PCH in the first circuit 1 and a PCH in the third circuit 3 are both in place, and neither of a PCH in the second circuit 2 and a PCH in the fourth circuit 4 is in place. Through switching action of the switch module 7 in each said circuit, the first circuit 1 and the second circuit 2 form a 4-path server, and the third circuit 3 and the fourth circuit 4 form a 4-path server (that is, form two secondary partitions). For the 4-path server formed by the first circuit 1 and the second circuit 2, a PMSYNC signal given by the PCH in the first circuit 1 may be outputted to the two CPUs in the first circuit 1 through the extended module 6 in the first circuit, and the PMSYNC signal given by the PCH in the first circuit 1 may be outputted to the two CPUs in the second circuit 2 through the extended module 6 in the first circuit 1 and the switch module 7 in the second circuit 2. For the 4-path server formed by the third circuit 3 and the fourth circuit 4, a PMSYNC signal given by the PCH in the third circuit 3 may be outputted to the two CPUs in the third circuit 3 through the extended module 6 in the third circuit, and the PMSYNC signal given by the PCH in the third circuit 3 may be outputted to the two CPUs in the fourth circuit 4 through the extended module 6 in the third circuit 3 and the switch module 7 in the fourth circuit 4, to implement interconnection of PMSYNC signals in the secondary partition.

When the target partition instruction is a quarter partition instruction, in this case, the PCHs in the four circuits are all in place. Through switching action of the switch modules 7 in the four circuits, the four circuits form four independent computing nodes, to form four 2-path servers (that is, form four quarter partitions). In this case, for the first circuit 1, the first circuit 1 forms a 2-path server. The PMSYNC signal given by the PCH in the first circuit 1 is directly outputted to the two CPUs in the first circuit 1 through the extended module 6 in the first circuit. The second circuit 2 also forms a 2-path server, and may keep, by using the switch module 7 in the second circuit, the PMSYNC signal from the first circuit 1 is refused to reach the two CPUs in the second circuit 2, and by using the switch module 7 in the second circuit, the PMSYNC signal given by the PCH in the second circuit is sent to two CPUs in the second circuit through the extended module 6 in the second circuit. A process of the third circuit 3 is similar to that of the second circuit 2. Details are not described herein again. The fourth circuit 4 also forms a 2-path server, and may keep, by using the switch module 7 in the fourth circuit, PMSYNC signals from a first circuit 1 and a third circuit 3 are refused to reach the two CPUs in the fourth circuit 4, and by using the switch module 7 in the fourth circuit, the PMSYNC signal given by the PCH in the fourth circuit is sent to two CPUs in the fourth circuit through the extended module 6 in the fourth circuit. The interconnection of PMSYNC signals in the quarter partition can be implemented by using the foregoing process.

As can be seen from the foregoing process, in the present application, only eight CPUs in one server are required to implement interconnection and routing of PMSYNC signals in a single partition mode, a secondary partition mode, and a quarter partition mode, to change the current situation that eight CPUs in a server can only fixedly form one partition mode and interconnection and routing of PMSYNC signals is only implemented in one partition mode. Therefore, the interconnection flexibility of PMSYNC signals can be improved, so that the applicability of an 8-path server is improved.

In the foregoing technical solution according to the embodiments of the present application, each of the first circuit, the second circuit, the third circuit, and the fourth circuit includes a PCH, an extended module connected to the PCH, a switch module connected to the extended module, and two CPUs connected to the switch module. The extended module in the first circuit is connected to the switch module in the second circuit, the switch module in the third circuit, and the switch module in the fourth circuit. The extended module in the third circuit is connected to the switch module in the fourth circuit. After the switch module and the PCH in each said circuit receive a target partition instruction, the switch module performs switching action according to the target partition instruction, and the PCH performs in-place action according to the target partition instruction, such that each said circuit forms a target partition such as a single partition, a secondary partition, and a quarter partition corresponding to the target partition instruction, that is, PMSYNC signals can be interconnected in the single partition, the secondary partition, and the quarter partition by using eight CPUs, to change the current situation that PMSYNC signals can only be interconnected in a single fixed partition formed by eight CPUs. Therefore, the interconnection flexibility of PMSYNC signals can be improved, so that the applicability of an 8-path server is improved.

The multi-path server provided in embodiments of the present application may further include a first computing board Node 0, a second computing board Node 1, a third computing board Node 2, a fourth computing board Node 3, and a backplate 5 connected to the four computing boards.

The first circuit 1 is located on the first computing board Node 0, the second circuit 2 is located on the second computing board Node 1, the third circuit 3 is located on the third computing board Node 2, the fourth circuit 4 is located on the fourth computing board Node 3, an extended module in the first circuit 1 is connected to a switch module in the second circuit 2, a switch module in the third circuit 3, and a switch module in the fourth circuit 4 through the backplate 5, and an extended module in the third circuit 3 is connected to a switch module in the fourth circuit 4 through the backplate 5.

The multi-path server provided in the present application may include a first computing board Node 0, a second computing board Node 1, a third computing board Node 2, a fourth computing board Node 3, and a backplate 5 connected to the four computing boards. The four computing boards may have identical hardware, and may be specifically distinguished by using physic positions in a server chassis. The first circuit 1 discussed above may be located on the first computing board Node 0, the second circuit 2 may be located on the second computing board Node 1, the third circuit 3 may be located on the third computing board Node 2, and the fourth circuit 4 may be located on the fourth computing board Node 3. In addition, the extended module in the first circuit 1 located on the first computing board Node 0 may be connected to the switch module in the second circuit 2 located on the second computing board Node 1, the switch module in the third circuit 3 located on the third computing board Node 2, and the switch module in the fourth circuit 4 located on the fourth computing board Node 3 through the backplate 5. The extended module in the third circuit 3 located on the third computing board Node 2 may be connected to the switch module in the fourth circuit 4 located on the fourth computing board Node 3 through the backplate 5.

The four circuits may be distributed in partitions in the foregoing manner, to implement distributed management of four circuits, interconnection and routing of PMSYNC signals in a single partition mode, a secondary partition mode, and a quarter partition mode may be implemented by using one backplate 5 in the foregoing manner, and various backplates are not needed for implementation. Therefore, design costs and material costs of interconnection of PMSYNC signals can be reduced, and the complexity of interconnection of PMSYNC signals can be reduced by using one backplate 5, so that maintenance difficulty of PMSYNC signals can be reduced. It needs to be noted that the foregoing four circuits may be located on a same computing board, and the backplate 5 and the computing board may have an integrated structure. Alternatively, the four circuits may be located on two computing boards (which may be specifically that two circuits are distributed on each computing board, or one circuit is distributed on one computing board, and three circuits are distributed on the other computing board), and the backplate 5 is connected to the two computing boards. That is, distribution of four circuits in the present application on a computing board and the backplate 5 is not limited to the foregoing manner of four computing boards and one backplate 5.

In the multi-path server provided in embodiments of the present application, the extended module 6 may include a first extender Buffer1 and a second extender Buffer2.

Each first extender Buffer1 is connected to a switch module 7 in a computing board in which the first extender is located. A first extender Buffer1 in the first computing board Node 0 is connected to a switch module 7 in the second computing board Node 1. A second extender Buffer2 in the first computing board Node 0 is connected to a switch module 7 in the third computing board Node 2 and a switch module 7 in the fourth computing board Node 3. A first extender Buffer1 in the third computing board Node 2 is connected to the switch module 7 in the fourth computing board Node 3.

In consideration of that the PMSYNC signal outputted by the PCH when in place is two pairs of signals. One pair is PMSYNC and PMSYNC_CLK, and the other pair is PMSYNC2 and PMSYNC_CLK2. Therefore, the extended module 6 included in each computing board may specifically include a first extender Buffer1 and a second extender Buffer2. The first extender Buffer1 may be configured to extend the pair of PMSYNC signals including PMSYNC and PMSYNC_CLK. The second extender Buffer2 may be configured to extend the pair of PMSYNC signals including PMSYNC2 and PMSYNC_CLK2.

A first extender Buffer1 in each computing board is connected to a switch module 7 in a computing board in which the first extender (which is specifically the first extender Buffer1) is located, such that when the PCH in the computing board in which the first extender Buffer1 is located is in place and the switch module 7 is closed, a pair of PMSYNC signals including PMSYNC and PMSYNC_CLK given by a corresponding PCH can be sent, through the first extender Buffer1 and the switch module 7, to two CPUs in the computing board in which the first extender Buffer1 is located. In addition, the first extender Buffer1 in the first computing board Node 0 is further connected to the switch module 7 in the second computing board Node 1, the second extender Buffer2 in the first computing board Node 0, and the switch module 7 in the third computing board Node 2, and the switch module 7 in the fourth computing board Node 3. The first extender Buffer1 in the third computing board Node 2 is connected to the switch module 7 in the fourth computing board Node 3. In this path, through a connection relationship between a corresponding extender and a switch module 7 in a corresponding computing board, a corresponding partition function can be implemented when a target partition instruction is received, and PMSYNC signals given by the PCH can be interconnected in a corresponding partition.

In the multi-path server provided in embodiments of the present application, the switch module 7 may include a first switch group, a second switch group, and a third switch group.

A first terminal of each said first switch group is configured to receive a target partition instruction, a second terminal of each said first switch group is connected to a first extender Buffer1 in a computing board in which the first switch group is located, and a third terminal of each said first switch group is connected to the CPUs in the computing board in which the first switch group is located.

A first terminal of each said second switch group is configured to receive a target partition instruction, a second terminal of each said second switch group is connected to the CPUs in a computing board in which the second switch group is located, and a third terminal of each said second switch group is connected to a first terminal of a third switch group of the computing board in which the second switch group is located.

A second terminal of each said third switch group is configured to receive the target partition instruction, a third terminal and a fourth terminal of a third switch group in the second computing board Node 1 are both connected to a first extender Buffer1 in the first computing board Node 0, a third terminal of a third switch group in the third computing board Node 2 is connected to a second extender Buffer2 in the first computing board Node 0, a third terminal of a third switch group in the fourth computing board Node 3 is connected to a second extender Buffer2 in the first computing board Node 0, and a fourth terminal of a third switch group in the fourth computing board Node 3 is connected to a first extender Buffer1 in the third computing board Node 2.

In the multi-path server provided in the present application, the switch module 7 in each computing board may include a first switch group, a second switch group, and a third switch group. A first terminal of each said first switch group is configured to receive a target partition instruction, a second terminal of each said first switch group is connected to a first extender Buffer1 in a computing board in which the first switch group is located, and a third terminal of each said first switch group is connected to two CPUs in the computing board in which the first switch group is located. A first terminal of each said second switch group is configured to receive a target partition instruction, a second terminal of each said second switch group is connected to two CPUs in a computing board in which the second switch group is located, and a third terminal of each said second switch group is connected to a first terminal of a third switch group of the computing board in which the second switch group is located. A second terminal of each said third switch group is configured to receive the target partition instruction. In addition, a third terminal and a fourth terminal of a third switch group in the second computing board Node 1 are both connected to a first extender Buffer1 in the first computing board Node 0, a third terminal of a third switch group in the third computing board Node 2 is connected to a second extender Buffer2 in the first computing board Node 0, a third terminal of a third switch group in the fourth computing board Node 3 is connected to a second extender Buffer2 in the first computing board Node 0, and a fourth terminal of a third switch group in the fourth computing board Node 3 is connected to a first extender Buffer1 in the third computing board Node 2.

When the target partition instruction is a quarter partition instruction, the PCH in each computing board is in place. In this case, a second terminal and a third terminal in a first switch group in each computing board are connected, such that a PMSYNC signal given by the PCH in each computing board may be sent, through a first extender Buffer1 of the computing board and the first switch group, to two CPUs in the computing board. A second terminal and a third terminal in a second switch group in each computing board are disconnected, and a third terminal and a first terminal in a third switch group in each computing board are connected. In this case, a second terminal and the third terminal in the third switch group are disconnected, such that each computing board does not receive a PMSYNC signal sent by another computing board. That is, the computing board are isolated from each other, to form four quarter partitions.

When the target partition instruction is a secondary partition instruction, a PCH in the first computing board Node 0 and a PCH in the third computing board Node 2 are both in place. For the first computing board Node 0 and the third computing board Node 2, a second terminal and a third terminal in a first switch group are connected, a second terminal and a third terminal in a second switch group are connected, a fourth terminal and a first terminal in a third switch group are connected. Neither of a PCH in the second computing board Node 1 and a PCH in the fourth computing board Node 3 is in place. For the second computing board Node 1 and the fourth computing board Node 3, a second terminal and a third terminal in a first switch group are disconnected, a second terminal and a third terminal in a second switch group are connected, and a fourth terminal and a first terminal in a third switch group are connected. In this case, according to an in-place status of the PCH in the first computing board Node 0 and a connection relationship of the three switch groups in the first computing board, an in-place status of the PCH in the second computing board Node 1 and a connection relationship of the three switch groups in the second computing board, a connection status of a third switch group in the third computing board Node 2 and the first computing board Node 0, and a connection status of a third switch group in the fourth computing board Node 3 and the first computing board Node 0 and the third computing board Node 2, the first computing board Node 0 and the second computing board Node 1 may form one secondary partition, one pair of PMSYNC signals including PMSYNC and PMSYNC_CLK outputted by the PCH in the first computing board Node 0 can be outputted to two CPUs in the first computing board Node 0 through the first extender Buffer1 in the first computing board Node 0, and one pair of PMSYNC signals including PMSYNC and PMSYNC_CLK outputted by the PCH in the first computing board Node 0 can be outputted to two CPUs in the second computing board Node 1 through the first extender Buffer1 in the first computing board Node 0 and the third switch group and second switch group in the second computing board Node 1. In addition, according to an in-place status of the PCH in the third computing board Node 2 and a connection relationship of the three switch groups in the third computing board, an in-place status of the PCH in the fourth computing board Node 3 and a connection relationship of the three switch groups in the fourth computing board, a connection status of the third switch group in the third computing board Node 2 and the first computing board Node 0, and a connection status of the third switch group in the fourth computing board Node 3 and the third computing board Node 2, the third computing board Node 2 and the fourth computing board Node 3 form one secondary partition, one pair of PMSYNC signals including PMSYNC and PMSYNC_CLK outputted by the PCH in the third computing board Node 2 can be outputted to two CPUs in the third computing board Node 2 through a first extender Buffer1 in the third computing board Node 2, and one pair of PMSYNC signals including PMSYNC and PMSYNC_CLK outputted by the PCH in the third computing board Node 2 can be outputted to two CPUs in the fourth computing board Node 3 through the first extender Buffer1 in the third computing board Node 2 and the third switch group and a second switch group in the fourth computing board Node 3.

When the target partition instruction is a single partition instruction, a PCH in the first computing board Node 0 is in place, a second terminal and a third terminal in a first switch group in the first computing board Node 0 are connected, a second terminal and a third terminal in a second switch group in the first computing board Node 0 are connected, a third terminal and a first terminal in a third switch group in the first computing board Node 0 are connected, none of a PCH in the second computing board Node 1, a PCH in the third computing board Node 2, and a PCH in the fourth computing board Node 3 is in place, a second terminal and a third terminal in a first switch group in the second computing board Node 1 are disconnected, a second terminal and a third terminal in a first switch group in the third computing board Node 2 are disconnected, a second terminal and a third terminal in a first switch group in the fourth computing board Node 3 are disconnected, a second terminal and a third terminal in a second switch group in the second computing board Node 1 are connected, a second terminal and a third terminal in a second switch group in the third computing board Node 2 are connected, a second terminal and a third terminal in a second switch group in the fourth computing board Node 3 are connected, a third terminal and a first terminal in a third switch group in the second computing board Node 1 are connected, a third terminal and a first terminal in a third switch group in the third computing board Node 2 are connected, and a third terminal and a first terminal in a third switch group in the fourth computing board Node 3 are connected, such that the first computing board Node 0, the second computing board Node 1, the third computing board Node 2, and the fourth computing board Node 3 form a single partition, one pair of PMSYNC signals including PMSYNC and PMSYNC_CLK outputted by the PCH in the first computing board Node 0 can be outputted to two CPUs in the first computing board Node 0 through a first extender Buffer1 in the first computing board Node 0, and outputted to two CPUs in the second computing board Node 1 through the first extender Buffer1 in the first computing board Node 0 and the third switch group and the second switch group in the second computing board Node 1, and one pair of PMSYNC signals including PMSYNC2 and PMSYNC_CLK2 outputted by the PCH in the first computing board Node 0 can be outputted to two CPUs in the third computing board Node 2 through a second extender Buffer2 in the first computing board Node 0 and the third switch group and second switch group in the third computing board Node 2, and outputted to two CPUs in the fourth computing board Node 3 through the second extender Buffer2 in the first computing board Node 0 and the third switch group and second switch group in the fourth computing board Node 3.

In the multi-path server provided in embodiments of the present application, the first switch group may include a first analog switch SW1 and a second analog switch SW2, a first terminal of the first analog switch SW1 and a first terminal of the second analog switch SW2 are used as a first terminal of the first switch group, a second terminal of the first analog switch SW1 and a second terminal of the second analog switch SW2 are used as a second terminal of the first switch group, the second terminal of the first analog switch SW1 is connected to a first output terminal Buffer1 of the first extender, the second terminal of the second analog switch SW2 is connected to a second output terminal of the first extender Buffer1, a third terminal of the first analog switch SW1 and a third terminal of the second analog switch SW2 are used as a third terminal of the first switch group, the third terminal of the first analog switch SW1 is connected to a first CPU in a computing board in which the first analog switch is located, and the third terminal of the second analog switch SW2 is connected to a second CPU in a computing board in which the second analog switch is located.

In consideration of that each computing board includes two CPUs, the first switch group may specifically include the first analog switch SW1 and the second analog switch SW2. The first analog switch SW1 is connected to a first CPU and the first output terminal of the first extender Buffer1, and the second analog switch SW2 is connected to a second CPU and the second output terminal of the first extender Buffer1. The first terminal (that is, a terminal OE in FIG. 4) of the first analog switch SW1 and the first terminal of the second analog switch SW2 may both be configured to receive a target partition instruction (specifically receive a PCH_BD_presence signal in the target partition instruction). When the first terminals of the two analog switches are at a 0 level (low level), a corresponding second terminal (that is, a terminal A in FIG. 4) and third terminal (that is, a terminal B in FIG. 3) are disconnected (that is, a corresponding channel A and channel B are disconnected). When the first terminals are at a 1 level (a high level), a corresponding second terminal and third terminal are connected (that is, a corresponding channel A and channel B are connected).

For details, refer to Table 1. Table 1 shows level values of the first analog switches SW1 and the second analog switches SW2 in the four computing boards:

TABLE 1

Level values of the first analog switches SW1 and the second analog switches SW2 in the four computing boards

|  | Node 0 | Node 1 | Node 2 | Node 3 |
| --- | --- | --- | --- | --- |
| Single | 1 | 0 | 0 | 0 |
| Secondary | 1 | 0 | 1 | 0 |
| Quarter | 1 | 1 | 1 | 1 |

In addition, when the PCH_BD_presence signal in the target partition instruction is 0, the PCH is not in place, and when the PCH_BD_presence signal in the target partition instruction is 1, the PCH is in place.

In the multi-path server provided in embodiments of the present application, the second switch group may include a third analog switch SW3 and a fourth analog switch SW4, a first terminal of the third analog switch SW3 and a first terminal of the fourth analog switch SW4 are used as a first terminal of the second switch group, a second terminal of the third analog switch SW3 and a second terminal of the fourth analog switch SW4 are used as a second terminal of the second switch group, a second terminal of the third analog switch SW3 is connected to a second CPU in a computing board in which the third analog switch is located, a second terminal of the fourth analog switch SW4 is connected to a first CPU in a computing board in which the fourth analog switch is located, and a third terminal of the third analog switch SW3 and a third terminal of the fourth analog switch SW4 are used as a third terminal of the second switch group.

In the multi-path server provided in the present application, the second switch group may include the third analog switch SW3 and the fourth analog switch SW4. In each computing board, the first terminal of the third analog switch SW3 and the first terminal of the fourth analog switch SW4 are configured to receive a target partition instruction (specifically receive a 2S_mode signal in the target partition instruction). The second terminal of the third analog switch SW3 is connected to a second CPU in a computing board in which the third analog switch is located. The third terminal of the third analog switch SW3 is connected to a first terminal of a third switch group in the computing board in which the third analog switch is located. The second terminal of the fourth analog switch SW4 is connected to a first CPU in a computing board in which the fourth analog switch is located. The third terminal of the fourth analog switch SW4 is connected to a first terminal of a third switch group in the computing board in which the fourth analog switch is located. A conduction manner of the third analog switch SW3 and the fourth analog switch SW4 is similar to that of the first analog switch SW1 and the second analog switch SW2, that is, when the first terminal is at a low level, the second terminal and the third terminal are disconnected, and when the first terminal is at a high level, the second terminal and the third terminal are connected.

It needs to be noted that, the 2S_mode signal is a quarter partition control signal, and is valid at a low level. Specifically, when the 2S_mode signal is 0, the signal is a quarter partition instruction. When the 2S_mode signal is 1, the signal is a non-quarter partition instruction.

In the multi-path server provided in embodiments of the present application, the third switch group may include a first multiplexer MUX1 and a second multiplexer MUX2, a first terminal of the first multiplexer MUX1 and a first terminal of the second multiplexer MUX2 are used as a first terminal of the third switch group, the first terminal of the first multiplexer MUX1 is connected to a third terminal of a fourth analog switch SW4 in a computing board in which the first multiplexer is located, a first terminal of the second multiplexer MUX2 is connected to a third terminal of a third analog switch SW3 in a computing board in which the second multiplexer is located, a second terminal of the first multiplexer MUX1 and a second terminal of the second multiplexer MUX2 are used as a second terminal of the third switch group, a third terminal of the first multiplexer MUX1 and a third terminal of the second multiplexer MUX2 are used as a third terminal of the third switch group, and a fourth terminal of the first multiplexer MUX1 and a fourth terminal of the second multiplexer MUX2 are used as a fourth terminal of the third switch group.

A third terminal and a fourth terminal of the first multiplexer MUX1 in the second computing board Node 1 are connected to a third output terminal of a first extender Buffer1 in the first computing board Node 0, and a third terminal and a fourth terminal of the second multiplexer MUX2 in the second computing board Node 1 are connected to a fourth output terminal of a first extender Buffer1 in the first computing board Node 0.

A third terminal of a first multiplexer MUX1 in the third computing board Node 2 is connected to a first output terminal of a second extender Buffer2 in the first computing board Node 0, and a third terminal of a second multiplexer MUX2 in the third computing board Node 2 is connected to a second output terminal of a second extender Buffer2 in the first computing board Node 0.

A third terminal of a first multiplexer MUX1 in the fourth computing board Node 3 is connected to a third output terminal of a second extender Buffer2 in the first computing board Node 0, a fourth terminal of a first multiplexer MUX1 in the fourth computing board Node 3 is connected to a third output terminal of a first extender Buffer1 in the third computing board Node 2, a third terminal of a second multiplexer MUX2 in the fourth computing board Node 3 is connected to a fourth output terminal of a second extender Buffer2 in the first computing board Node 0, and a fourth terminal of a second multiplexer MUX2 in the fourth computing board Node 3 is connected to a fourth output terminal of a second extender Buffer2 in the third computing board Node 2.

In the multi-path server provided in the present application, the third switch group may include the first multiplexer MUX1 and the second multiplexer MUX2, and the first multiplexer MUX1 and the second multiplexer MUX2 are both 1:2 MUX chips. A second terminal (that is, a signal received by an S (gating) terminal in FIG. 4) of a MUX chip is used to control a first terminal (that is, A in FIG. 4) of the MUX chip to be connected to a third terminal (that is, B1 in FIG. 4) of the MUX chip or to be connected to a fourth terminal (that is, B0 in FIG. 4) of the MUX chip. When a second terminal of a multiplexer is at a 0 level (low level), a first terminal and a fourth terminal are connected. When a second terminal is at a 1 level (high level), the first terminal and a third terminal are connected. The second terminal of the first multiplexer MUX1 and the second terminal of the second multiplexer MUX2 may both be configured to receive a target partition instruction (specifically receive a 4S_mode signal in the target partition instruction). The 4S_mode signal is a secondary partition control signal, and is valid at a low level. Specifically, when the 4S_mode signal is 0, the signal is a secondary partition instruction. When the 4S_mode signal is 1, the signal is a non-quarter secondary instruction.

With reference to the foregoing 2S_mode signal, for details, refer to Table 2. Table 2 shows level values of the 2S_mode signal and the 4S_mode signal.

TABLE 2

| Level values of a 2S mode signal and a 4S mode signal | | | |
|---|---|---|---|
| | Single partition | Secondary | Quarter partition |
| 2S mode | 1 | 1 | 0 |
| 4S mode | 1 | 0 | 1 |

With reference to that each of first switch group and the third switch group correspondingly includes two components, each of the first extender Buffer1 and the second extender Buffer2 may include four output terminals, specifically, four output terminals Q0 to Q3 shown in FIG. 4. Q0 is a first output terminal of an extender, Q1 is a second output terminal of the extender, Q2 is a third output terminal of the extender, and Q3 is a fourth output terminal of the extender. That is, a PMSYNC/PMSYNC_CLK signal may be extended into four outputs by using an extender (that is, Buffer in FIG. 4), and may be extended into eight groups of PMSYNC/PMSYNC_CLK signals by using two extenders.

With reference to the foregoing signal level values and a relationship between components, a quarter partition, a secondary partition, and a single partition may be described below in detail:

(1) Quarter Partition

For a quarter partition, a first computing board Node 0, a second computing board Node 1, a third computing board Node 2, and a fourth computing board Node 3 are four independent computing nodes. The first computing board Node 0 is used as an example. In this case, 2S_mode is at a 0 level, neither of channels A and B of the third analog switch SW3 and the fourth analog switch SW4 is open, PCH_BD_presence is at a 1 level, and channels A and B of the first analog switch SW1 and the second analog switch SW2 are open. In this case, the PCH provides a PMSYNC signal path to the first CPU and the second CPU through a channel Q0 and a channel Q1 of the first extender Buffer1.

Processes of the other three computing boards are similar to a process of the first computing board Node 0. Details are not described herein again.

(2) Secondary Partition

For a secondary partition, the first computing board Node 0 and the second computing board Node 1 form a 4-path server, and the third computing board Node 2 and the fourth computing board Node 3 form a 4-path server.

On the first computing board Node 0, 2S_mode is at a 1 level, channels A and B of the third analog switch SW3 and the fourth analog switch SW4 are both open. However, the backplate 5 is disconnected. The PCH_BD_presence is at a 1 level, and channels A and B of the first analog switch SW1 and the second analog switch SW2 are both open. 4S_mode is at a 0 level, and channels A and B0 of the first multiplexer MUX1 and the second multiplexer MUX2 are open. The PCH provides a PMSYNC signal path to the first CPU and the second CPU through channels Q0 and Q1 of the first extender Buffer1.

On the second computing board Node 1, 2S_mode is at a 1 level, channels A and B of the third analog switch SW3 and the fourth analog switch SW4 are both open. The PCH_BD_presence is at a 0 level, and channels A and B of the first analog switch SW1 and the second analog switch SW2 are both closed. 4S_mode is at a 0 level, and channels A and B0 of the first multiplexer MUX1 and the second multiplexer MUX2 are open. In this case, a PMSYNC signal from a channel Q2 of the first extender Buffer1 in the first computing board Node 0 passes through B0-A of the first multiplexer MUX1 in the second computing board Node 1, then passes through the fourth analog switch SW4, and reaches the first CPU in the second computing board Node 1. A PMSYNC signal from a channel Q3 of the first extender Buffer1 in the first computing board Node 0 passes through B0-A of the second multiplexer MUX2 in the second computing board Node 1, then passes through the third analog switch SW3, and reaches the second CPU in the second computing board Node 1.

On the third computing board Node 2, 2S_mode is at a 1 level, channels A and B of the third analog switch SW3 and the fourth analog switch SW4 are both open. The PCH_BD_presence is at a 1 level, and channels A and B of the first analog switch SW1 and the second analog switch SW2 are both open. 4S_mode is at a 0 level, and channels A and B0 of the first multiplexer MUX1 and the second multiplexer MUX2 are open. However, the backplate 5 is disconnected. The PCH provides a PMSYNC signal path to the first CPU and the second CPU through channels Q0 and Q1 of the first extender Buffer1.

On the fourth computing board Node 3, 2S_mode is at a 1 level, channels A and B of the third analog switch SW3 and the fourth analog switch SW4 are both open. The PCH_BD_presence is at a 0 level, and channels A and B of the first analog switch SW1 and the second analog switch SW2 are both closed. 4S_mode is at a 0 level, and channels A and B0 of the first multiplexer MUX1 and the second multiplexer MUX2 are open. In this case, a PMSYNC signal from a channel Q2 of the first extender Buffer1 of the third computing board Node 2 passes through B0-A of the first multiplexer MUX1 in the fourth computing board Node 3, then passes through the fourth analog switch SW4, and reaches the first CPU. A PMSYNC signal from a channel Q3 of the first extender Buffer1 of the third computing board Node 2 passes through B0-A of the second multiplexer MUX2 in the fourth computing board Node 3, then passes through the third analog switch SW3, and reaches the second CPU.

(3) Single Partition

For a single partition, the first computing board Node 0, the second computing board Node 1, the third computing board Node 2, and the fourth computing board Node 3 form an 8-path system.

On the first computing board Node 0, 2S_mode is at a 1 level, channels A and B of the third analog switch SW3 and the fourth analog switch SW4 are both open. However, the backplate 5 is disconnected. The PCH_BD_presence is at a 1 level, and channels A and B of the first analog switch SW1 and the second analog switch SW2 are both open. 4S_mode is at a 1 level, and channels A and B1 of the first multiplexer MUX1 and the second multiplexer MUX2 are open. The PCH provides a PMSYNC signal path to the first CPU and the second CPU through channels Q0 and Q1 of the first extender Buffer1.

On the second computing board Node 1, 2S_mode is at a 1 level, channels A and B of the third analog switch SW3 and the fourth analog switch SW4 are both open. The PCH_BD_presence is at a 0 level, and channels A and B of the first analog switch SW1 and the second analog switch SW2 are both closed. 4S_mode is at a 1 level, and channels A and B1 of the first multiplexer MUX1 and the second multiplexer MUX2 are open. In this case, a PMSYNC signal from a channel Q2 of the first extender Buffer1 in the first computing board Node 0 passes through B1-A of the first multiplexer MUX1 in the second computing board Node 1, then passes through the fourth analog switch SW4, and reaches the first CPU. A PMSYNC signal from a channel Q3 of the first extender Buffer1 in the first computing board Node 0 passes through B1-A of the second multiplexer MUX2, then passes through the third analog switch SW3, and reaches the second CPU.

On the third computing board, 2S_mode is at a 1 level, channels A and B of the third analog switch SW3 and the fourth analog switch SW4 are both open. The PCH_BD_presence is at a 0 level, and channels A and B of the first analog switch SW1 and the second analog switch SW2 are both closed. 4S_mode is at a 1 level, and channels A and B1 of the first multiplexer MUX1 and the second multiplexer MUX2 are open. In this case, a PMSYNC signal from a channel Q0 of the second extender Buffer2 in the first computing board Node 0 passes through B1-A of the first multiplexer MUX1 in the third computing board Node 2, then passes through the fourth analog switch SW4, and reaches the first CPU. A PMSYNC signal from a channel Q1 of the second extender Buffer2 in the first computing board Node 0 passes through B1-A of the second multiplexer MUX2 in the third computing board Node 2, then passes through the third analog switch SW3, and reaches the second CPU.

On the fourth computing board Node 3, 2S_mode is at a 1 level, channels A and B of the third analog switch SW3 and the fourth analog switch SW4 are both open. The PCH_BD_presence is at a 0 level, and channels A and B of the first analog switch SW1 and the second analog switch SW2 are both closed. 4S_mode is at a 1 level, and channels A and B1 of the first multiplexer MUX1 and the second multiplexer MUX2 are open. In this case, a PMSYNC signal from a channel Q2 of the second extender Buffer2 in the first computing board Node 0 passes through B1-A of the first multiplexer MUX1 in the fourth computing board Node 3, then passes through the fourth analog switch SW4, and reaches the first CPU. A PMSYNC signal from a channel Q3 of the second extender Buffer2 in the first computing board Node 0 passes through B1-A of the second multiplexer MUX2 in the fourth computing board Node 3, then passes through the third analog switch SW3, and reaches the second CPU.

In summary, the PCH of the first computing board Node 0 provides a PMSYNC signal path to eight CPUs. In the multi-path server provided in embodiments of the present application, the backplate 5 is connected to each computing board by a high-speed connector.

In the present application, the backplate 5 configured to interconnect PMSYNC signals of four computing boards may be connected to each computing board through a high-speed connector.

An embodiment of the present application further provides a multi-path server signal interconnection system. The system may include any foregoing multi-path server, and a controller connected to a PCH and a switch module 7 in each computing board in the multi-path server, where the controller is configured to output a target partition instruction.

The present application further provides a multi-path server signal interconnection system. The system may include any foregoing multi-path server, and may further include a controller. The controller may be connected to a PCH and a switch module 7 in each computing board in the multi-path server, and configured to output a target partition instruction, to enable the multi-path server to form a corresponding partition.

It needs to be noted that, for description of related parts of the multi-path server signal interconnection system provided in the present application, refer to detailed description of the foregoing corresponding part for details. Details are not described herein again.

It should be noted that the relational terms herein such as first and second are used only to differentiate an entity or operation from another entity or operation, and do not require or imply any actual relationship or sequence between these entities or operations. In addition, the terms "include", "comprise", or any variation thereof in the present disclosure are intended to cover a non-exclusive inclusion, to include inherent elements of a process, a method, a commodity or an object that includes a series of elements. If no more limitations are made, an element limited by "include a/an . . . " does not exclude other same elements existing in the process, the method, the commodity or the device which includes the element. In addition, the part of the above technical solutions provided in the embodiments of the present application that is consistent with the implementation principle of the corresponding technical solution in the prior art is not described in detail to avoid excessive redundancy.

The foregoing description of the disclosed embodiments is presented to enable persons skilled in the art to implement or use the present application. Various modifications to these embodiments are readily apparent to persons skilled in the art. The general principle defined herein may be implemented in other embodiments without departing from the spirit or scope of the present application. Thus, the present application is not to be limited to these embodiments shown herein, but are to be accorded the widest scope consistent with the principles and novel features disclosed herein.

What is claimed is:

1. A multi-path server, comprising a first circuit, a second circuit, a third circuit, and a fourth circuit, each of the four circuits comprising a Platform Controller Hub configured to output Power Management Synchronization signals when in place, an extended module connected to the Platform Controller Hub and configured to extend the Power Management Synchronization signal into multiple paths, a switch module connected to the extended module, and two CPUs connected to the switch module, wherein an extended module in the first circuit is connected to a switch module in the second circuit, a switch module in the third circuit, and a switch module in the fourth circuit, an extended module in the third circuit is connected to a switch module in the fourth circuit; and after a switch module and a Platform Controller Hub in each said circuit receive a target partition instruction, the switch module performs switching action according to the target partition instruction, and the Platform Controller Hub performs in-place action according to the target partition instruction, such that each said circuit forms a target partition corresponding to the target partition instruction, and the Power Management Synchronization signals are interconnected in the target partition through a corresponding CPU; the target partition comprises a single partition, a secondary partition, and a quarter partition;

wherein the third switch group comprises a first multi-path multiplexer and a second multi-path multiplexer, a first terminal of the first multi-path multiplexer and a first terminal of the second multi-path multiplexer are used as a first terminal of the third switch group, the first terminal of the first multi-path multiplexer is connected to a third terminal of a fourth analog switch in a computing board in which the first multi-path multiplexer is located, a first terminal of the second multi-path multiplexer is connected to a third terminal of a third analog switch in a computing board in which the second multi-path multiplexer is located, a second terminal of the first multi-path multiplexer and a second terminal of the second multi-path multiplexer are used as a second terminal of the third switch group, a third terminal of the first multi-path multiplexer and a third terminal of the second multi-path multiplexer are used as a third terminal of the third switch group, and a fourth terminal of the first multi-path multiplexer and a fourth terminal of the second multi-path multiplexer are used as a fourth terminal of the third switch group;

a third terminal and a fourth terminal of the first multi-path multiplexer in the second computing board are connected to a third output terminal of a first extender in the first computing board, and a third terminal and a fourth terminal of the second multi-path multiplexer in the second computing board are connected to a fourth output terminal of a first extender in the first computing board;

a third terminal of a first multi-path multiplexer in the third computing board is connected to a first output terminal of a second extender in the first computing board, and a third terminal of a second multi-path multiplexer in the third computing board is connected to a second output terminal of a second extender in the first computing board; and a third terminal of a first multi-path multiplexer in the fourth computing board is connected to a third output terminal of a second extender in the first computing board, a fourth terminal of a first multi-path multiplexer in the fourth computing board is connected to a third output terminal of a first extender in the third computing board, a third terminal of a second multi-path multiplexer in the fourth computing board is connected to a fourth output terminal of a second extender in the first computing board, and a fourth terminal of a second multi-path multiplexer in the fourth computing board is connected to a fourth output terminal of a second extender in the third computing board.

2. The multi-path server according to claim 1, further comprising a first computing board, a second computing board, a third computing board, a fourth computing board, and a backplate connected to the four computing boards, wherein the first circuit is located on the first computing board, the second circuit is located on the second computing board, the third circuit is located on the third computing board, the fourth circuit is located on the fourth computing board, an extended module in the first circuit is connected to a switch module in the second circuit, a switch module in the third circuit, and a switch module in the fourth circuit through the backplate, and an extended module in the third circuit is connected to a switch module in the fourth circuit through the backplate.

3. The multi-path server according to claim 2, wherein the extended module comprises a first extender and a second extender:

each said first extender is connected to a switch module in a computing board in which the first extender is located, a first extender in the first computing board is connected to a switch module in the second computing board, a second extender in the first computing board is connected to a switch module in the third computing board and a switch module in the fourth computing board, and a first extender in the third computing board is connected to a switch module in the fourth computing board.

4. The multi-path server according to claim 3, wherein the switch module comprises a first switch group, a second switch group, and a third switch group:
- a first terminal of each said first switch group is configured to receive the target partition instruction, a second terminal of each said first switch group is connected to a first extender in a computing board in which the first switch group is located, and a third terminal of each said first switch group is connected to the CPUs in the computing board in which the first switch group is located;
- a first terminal of each said second switch group is configured to receive the target partition instruction, a second terminal of each said second switch group is connected to the CPUs in a computing board in which the second switch group is located, and a third terminal of each said second switch group is connected to a first terminal of a third switch group of the computing board in which the second switch group is located; and
- a second terminal of each said third switch group is configured to receive the target partition instruction, a third terminal and a fourth terminal of a third switch group in the second computing board are both connected to a first extender in the first computing board, a third terminal of a third switch group in the third computing board is connected to a second extender in the first computing board, a third terminal of a third switch group in the fourth computing board is connected to a second extender in the first computing board, and a fourth terminal of a third switch group in the fourth computing board is connected to a first extender in the third computing board.

5. The multi-path server according to claim 4, wherein the first switch group comprises a first analog switch and a second analog switch, a first terminal of the first analog switch and a first terminal of the second analog switch are used as a first terminal of the first switch group, a second terminal of the first analog switch and a second terminal of the second analog switch are used as a second terminal of the first switch group, the second terminal of the first analog switch is connected to a first output terminal of the first extender, the second terminal of the second analog switch is connected to a second output terminal of the first extender, a third terminal of the first analog switch and a third terminal of the second analog switch are used as a third terminal of the first switch group, the third terminal of the first analog switch is connected to a first CPU in a computing board in which the first analog switch is located, and the third terminal of the second analog switch is connected to a second CPU in a computing board in which the second analog switch is located.

6. The multi-path server according to claim 5, wherein the second switch group comprises a third analog switch and a fourth analog switch, a first terminal of the third analog switch and a first terminal of the fourth analog switch are used as a first terminal of the second switch group, a second terminal of the third analog switch and a second terminal of the fourth analog switch are used as a second terminal of the second switch group, a second terminal of the third analog switch is connected to a second CPU in a computing board in which the third analog switch is located, a second terminal of the fourth analog switch is connected to a first CPU in a computing board in which the fourth analog switch is located, and a third terminal of the third analog switch and a third terminal of the fourth analog switch are used as a third terminal of the second switch group.

7. The multi-path server according to claim 4, wherein when the target partition instruction is a quarter partition instruction, Platform Controller Hubs in each said computing board are all in place, a second terminal and a third terminal in a first switch group in each said computing board are connected, a second terminal and a third terminal in a second switch group in each said computing board are disconnected, and a third terminal and a first terminal in a third switch group in each said computing board are connected.

8. The multi-path server according to claim 4, wherein when the target partition instruction is a secondary partition instruction, a Platform Controller Hub in the first computing board and a Platform Controller Hub in the third computing board are both in place, neither of a Platform Controller Hub in the second computing board and a Platform Controller Hub in the fourth computing board is in place;
- for the first computing board and the third computing board, a second terminal and a third terminal in a first switch group are connected, a second terminal and a third terminal in a second switch group are connected, a fourth terminal and a first terminal in a third switch group are connected;
- for the second computing board and the fourth computing board, a second terminal and a third terminal in a first switch group are disconnected, a second terminal and a third terminal in a second switch group are connected, and a fourth terminal and a first terminal in a third switch group are connected.

9. The multi-path server according to claim 4, wherein when the target partition instruction is a single partition instruction, a Platform Controller Hub in the first computing board is in place, none of a Platform Controller Hub in the second computing board, a Platform Controller Hub in the third computing board and a Platform Controller Hub in the fourth computing board is in place;
- a second terminal and a third terminal in a first switch group in the first computing board are connected, a second terminal and a third terminal in a second switch group in the first computing board are connected, a third terminal and a first terminal in a third switch group in the first computing board are connected;
- a second terminal and a third terminal in a first switch group in the second computing board are disconnected, a second terminal and a third terminal in a first switch group in the third computing board are disconnected, a second terminal and a third terminal in a first switch group in the fourth computing board are disconnected, a second terminal and a third terminal in a second switch group in the second computing board are connected, a second terminal and a third terminal in a second switch group in the third computing board are connected, a second terminal and a third terminal in a second switch group in the fourth computing board are connected, a third terminal and a first terminal in a third switch group in the second computing board are connected, a third terminal and a first terminal in a third switch group in the third computing board are connected, and a third terminal and a first terminal in a third switch group in the fourth computing board are connected.

10. The multi-path server according to claim 2, wherein the backplate is connected to each computing board by a high-speed connector.

11. The multi-path server according to claim 2, wherein each said computing board is distinguished by using a physic position in a server chassis.

12. The multi-path server according to claim 2, wherein each said computing board is a same computing board, each said circuit is located on the same computing board and the backplate and the same computing board have an integrated structure.

13. A multi-path server signal interconnection system, comprising the multi-path server according to claim 1, and a controller connected to a Platform Controller Hub and a switch module in each computing board in the multi-path server, wherein the controller is configured to output a target partition instruction.

14. The multi-path server according to claim 1, wherein when the target partition instruction is a single partition instruction, a Platform Controller Hub in the first circuit is in place, a Platform Controller Hub in the second circuit is not in place, a Platform Controller Hub in the third circuit is in place, a Platform Controller Hub in the fourth circuit is not in place; a switch module in each said circuit performs switching action according to the single partition instruction, such that the first circuit, the second circuit, the third circuit and the fourth circuit form a single partition, and a Power Management Synchronization signal given by the Platform Controller Hub in the first circuit is outputted to two CPUs in the first circuit through the extended module in the first circuit, and the Power Management Synchronization signal given by the Platform Controller Hub in the first circuit is outputted to two CPUs in the second circuit through an extended module in the first circuit and a switch module in the second circuit, is outputted to two CPUs in the third circuit through an extended module in the first circuit and a switch module in the third circuit, and is outputted to two CPUs in the fourth circuit through an extended module in the first circuit and a switch module in the fourth circuit.

15. The multi-path server according to claim 1, wherein when the target partition instruction is a secondary partition instruction, a Platform Controller Hub in the first circuit and a Platform Controller Hub in the third circuit are both in place, a Platform Controller Hub in the second circuit and a Platform Controller Hub in the fourth circuit are both not in place; a switch module in each said circuit performs switching action according to the secondary partition instruction, such that the first circuit and the second circuit form a first secondary partition, the third circuit and the fourth circuit form a second secondary partition, and:

a Power Management Synchronization signal given by the Platform Controller Hub in the first circuit is outputted to two CPUs in the first circuit through an extended module in the first circuit, and is outputted to two CPUs in the second circuit through an extended module in the first circuit and a switch module in the second circuit;

a Power Management Synchronization signal given by the Platform Controller Hub in the third circuit is outputted to two CPUs in the third circuit through an extended module in the third circuit, and is outputted to two CPUs in the fourth circuit through an extended module in the third circuit and a switch module in the fourth circuit.

16. The multi-path server according to claim 1, wherein when the target partition instruction is a quarter partition instruction, Platform Controller Hubs in each said circuit are all in place; a switch module in each said circuit performs switching action according to the quarter partition instruction, such that each said circuit form four independent computing nodes, to form four quarter partitions; and a Power Management Synchronization signal given by the Platform Controller Hub in the first circuit is directly outputted to two CPUs in the first circuit through an extended module in the first circuit;

by using a switch module in the second circuit, the second circuit refuses a Power Management Synchronization signal from the first circuit to reach two CPUs in the second circuit, and by using a switch module in the second circuit, a Power Management Synchronization signal given by a Platform Controller Hub in the second circuit is sent to two CPUs in the second circuit through an extended module in the second circuit;

by using a switch module in the third circuit, the third circuit refuses a Power Management Synchronization signal from the first circuit to reach two CPUs in the third circuit, and by using a switch module in the third circuit, a Power Management Synchronization signal given by a Platform Controller Hub in the third circuit is sent to two CPUs in the third circuit through an extended module in the third circuit;

by using a switch module in the fourth circuit, the fourth circuit refuses Power Management Synchronization signals from the first circuit and the second circuit to reach two CPUs in the fourth circuit, and by using a switch module in the fourth circuit, a Power Management Synchronization signal given by a Platform Controller Hub in the fourth circuit is sent to two CPUs in the fourth circuit through an extended module in the fourth circuit.

17. The multi-path server according to claim 1, wherein the Platform Controller Hub outputs two pairs of Power Management Synchronization signals when in place.

18. The multi-path server according to claim 17, wherein the two pairs of Power Management Synchronization signals comprise a signal used for data transmission and a clock signal used for synchronizing data.

19. The multi-path server according to claim 17, wherein the switch module is used for signal routing in a different partition.

* * * * *